(12) United States Patent
Fesi

(10) Patent No.: US 11,702,811 B1
(45) Date of Patent: *Jul. 18, 2023

(54) OIL SKIMMER AND METHOD OF USE

(71) Applicant: Michael A. Fesi, Houma, LA (US)

(72) Inventor: Michael A. Fesi, Houma, LA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,639

(22) Filed: Jan. 8, 2021

Related U.S. Application Data

(63) Continuation of application No. 16/400,688, filed on May 1, 2019, now Pat. No. 10,920,388, which is a continuation of application No. 14/165,288, filed on Jan. 27, 2014, now Pat. No. 10,323,374, which is a continuation of application No. 13/163,196, filed on Jun. 17, 2011, now Pat. No. 8,696,242.

(60) Provisional application No. 61/355,911, filed on Jun. 17, 2010.

(51) Int. Cl.
*E02B 15/00* (2006.01)
*E02B 15/04* (2006.01)
*B63B 35/32* (2006.01)
*E02B 15/08* (2006.01)

(52) U.S. Cl.
CPC ............ *E02B 15/046* (2013.01); *B63B 35/32* (2013.01); *E02B 15/048* (2013.01); *E02B 15/08* (2013.01); *Y02A 20/204* (2018.01)

(58) Field of Classification Search
CPC .............................. E02B 15/08; Y02A 20/204
USPC ..... 405/52, 60, 63, 64; 210/242.3, 776, 923, 210/747.6, 170.05, 170.11
See application file for complete search history.

(56) References Cited

U.S. PATENT DOCUMENTS

| | | | | |
|---|---|---|---|---|
| 3,754,653 | A | * | 8/1973 | Verdin .................... B63B 35/32 210/197 |
| 5,478,483 | A | * | 12/1995 | Gore ...................... E02B 15/048 210/776 |

* cited by examiner

*Primary Examiner* — Sean D Andrish
(74) *Attorney, Agent, or Firm* — Garvey, Smith & Nehrbass, Patent Attorneys, L.L.C.; Charles C. Garvey, Jr.; Julie Rabalais Chauvin

(57) ABSTRACT

The present invention provides an apparatus for removing oil or other pollutants from the surface of water and an improved method of removing oil or other pollutants from the surface of a body of water, comprising a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor; and a pump connected to the rear location that removes the oil from the rear location to a storage area which does not affect the ballast of the platform. The skimmer vessel can work stationary in the water, and does not require a propellor means, as the oil will continue to flow into the skimmer as the oil is pumped out of the rear by the gravity flow to the rear of the vessel.

14 Claims, 8 Drawing Sheets

OIL SKIMMER AND METHOD OF USE

CROSS-REFERENCE TO RELATED APPLICATIONS

This is a continuation of U.S. patent application Ser. No. 13/163,196, filed Jun. 17, 2011, which claims priority of U.S. Provisional Patent Application Ser. No. 61/355,911, filed Jun. 17, 2010, each of which is hereby incorporated herein by reference and priority of which is claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The apparatus of the present invention relates to skimming devices. More particularly, this invention relates to skimming devices for removal of oil or other pollutants from the surface water.

2. General Background of the Invention

There are skimming devices in the art, however, it is desirable that a skimming apparatus be a simple device that can work stationary in the water, and does not require a propellor or pulling means for operation, and easily adjustable so that the mouth of the skimmer sits at the interface of the oil and the water. It is also desirable that a user not need to continually adjust the skimmer elevation during use.

Examples of possibly related patents directed to such devices are listed in the following table.

The following U.S. Patents are incorporated herein by reference:

TABLE

| PATENT NO. | TITLE | ISSUE DATE MM-DD-YYYY |
|---|---|---|
| 3,704,784 | Floating Oil Skimmer | Dec. 5, 1972 |
| 3,730,346 | Skimming System | May 1, 1973 |
| 3,754,653 | Apparatus and Method for Collection of Oil from Surface of the Sea | Aug. 28, 1973 |
| 3,822,789 | Oil Skimmer Module with Free Floating Weir Trough | Jul. 9, 1974 |
| 3,862,904 | Boat for collecting oil slicks and other contaminants from the surface of water | Jan. 28, 1975 |
| 3,951,810 | Oil skimmer module with free floating weir trough | Apr. 20, 1976 |
| 4,208,287 | Oil spill skimmer | Jun. 17, 1980 |
| 4,477,348 | Open Sea Skimmer Barge | Oct. 16, 1984 |
| 5,043,065 | Variable draft oil/debris skimming vessel | Aug. 27, 1991 |
| 5,216,974 | Vessel for collecting and separating oil/water in a marine environment using submerged internal collection and separation | Jun. 8, 1993 |
| 5,478,483 | Oil spill skimmer with adjustable floating weir | Dec. 26, 1995 |
| 5,753,108 | Integrated oil response and recovery system and method and skimmer for use therein | May 19, 1998 |
| 6,471,862 | Oil skimming apparatus | Oct. 29, 2002 |

BRIEF SUMMARY OF THE INVENTION

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that removes the oil from the rear location to a storage area which does not affect the ballast of the platform.

Preferably, the floor is unobstructed.

Preferably, the bottom is flat.

Preferably, the level of the platform floor is variable to the consistency of the oil or pollutant on the water surface.

The apparatus can further comprise one or more propellers attached to the platform to self-propel the platform through the water.

Preferably, the apparatus further comprises a second vessel in which the oil is contained.

The apparatus can be moved by a hydraulic propellor, an outboard or a small boat.

Preferably, a vertical wall separates the ballast tanks.

The apparatus of the present invention includes a platform having a left side wall, a right side wall, a rear wall, a front opening, a floor, and a bottom, one or more ballasts which adjust the platform floor relative to a level of oil on the water surface, wherein the oil flows from the front opening across the floor to the rear wall, a rear location near the rear wall to collect the oil from the platform floor, and a pump connected to the rear location that moves the oil from the rear location to a storage area which does not affect the ballast of the platform.

The apparatus of the present invention includes a platform having a left side wall, a right side wall, a rear wall, a front opening, a floor, and a bottom, one or more ballasts which adjust the platform floor relative to a level of oil on the water surface, a rear location near the rear wall to collect the oil from the platform floor, and a pump connected to the rear location that moves the oil from the rear location to a storage area which does not affect the ballast of the platform, wherein the oil flows from the front opening across the floor to the rear wall when the front opening is below the surface of the oil.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that removes the oil from the rear location to a storage area.

Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

The present invention includes an apparatus for removing oil or other pollutants from the surface of water, comprising a platform having a left side wall, a right side wall, a rear wall, a front opening, an unobstructed floor, and a flat bottom, one or more ballasts located in the platform, wherein the ballasts adjust the platform floor relative to a predetermined level of oil on the water surface, one or more propellers attached to the platform to self-propel the platform through the water, wherein the oil flows from the front opening across the floor to the rear wall as the platform is being self-propelled, a rear location near the rear wall to collect the oil from the platform floor, and a pump connected to the rear location that moves the oil from the rear location to a storage area.

Preferably, the platform floor is about at the interface of the oil and the water. Preferably, the platform floor floats right below the surface of the oil.

Preferably, the ballasts are located in the left side wall and the right side wall.

Preferably, the rear location is a box or tank.

Preferably, the pump is a hydraulic pump.

Preferably, the rear location sits at a lower elevation than the floor.

The present invention also provides an improved method of removing oil or other pollutants from the surface of a body of water, comprising providing a platform having walls, a front opening, a floor, and a bottom; providing one or more ballasts which adjust the platform floor relative to a level of oil on the water surface; providing a rear location to collect the oil from the platform floor; and providing a pump connected to the rear location that moves the oil from the rear location to a storage area which does not affect the ballast of the platform, wherein the oil flows from the front opening across the floor to the rear wall when the front opening is below the surface of the oil. The present invention also includes a method of removing oil or other pollutants from the surface of water, wherein the platform floor is about at the interface of the oil and water. The present invention includes a method of removing oil or other pollutants from the surface of water, wherein the platform floor floats right below the surface of the oil. The present invention includes a method of removing oil or other pollutants from the surface of water, wherein in the ballasts are located in the left side wall and the right side wall. The present invention includes a method of removing oil or other pollutants from the surface of water, wherein the rear location is a box or tank. The present invention includes a method of removing oil or other pollutants from the surface of water, wherein the pump is a hydraulic pump. The present invention includes a method of removing oil or other pollutants from the surface of water, wherein the rear location sits at a lower elevation than the floor. The present invention includes a method of removing oil or other pollutants from the surface of water, wherein the floor is substantially unobstructed. The present invention includes a method of removing oil or other pollutants from the surface of water, wherein the bottom is flat. The present invention includes a method of removing oil or other pollutants from the surface of water, wherein the level of the platform floor is variable to the consistency of the oil or pollutant on the water surface. The present invention includes a method of removing oil or other pollutants from the surface of water further comprising one or more propellers attached to the platform. The present invention includes a method of removing oil or other pollutants from the surface of water further comprising providing a second vessel in which the storage area is located. The present invention includes a method of removing oil or other pollutants from the surface of water, wherein the apparatus is moved by a hydraulic propeller, an outboard or a small boat. The present invention includes a method of removing oil or other pollutants from the surface of water, wherein a vertical wall separates the ballast tanks.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

A preferred embodiment of the apparatus of the present invention is shown in FIGS. 1-8.

The present invention also provides an improved method of removing oil or other pollutants from the surface of a body of water.

Figure 1:
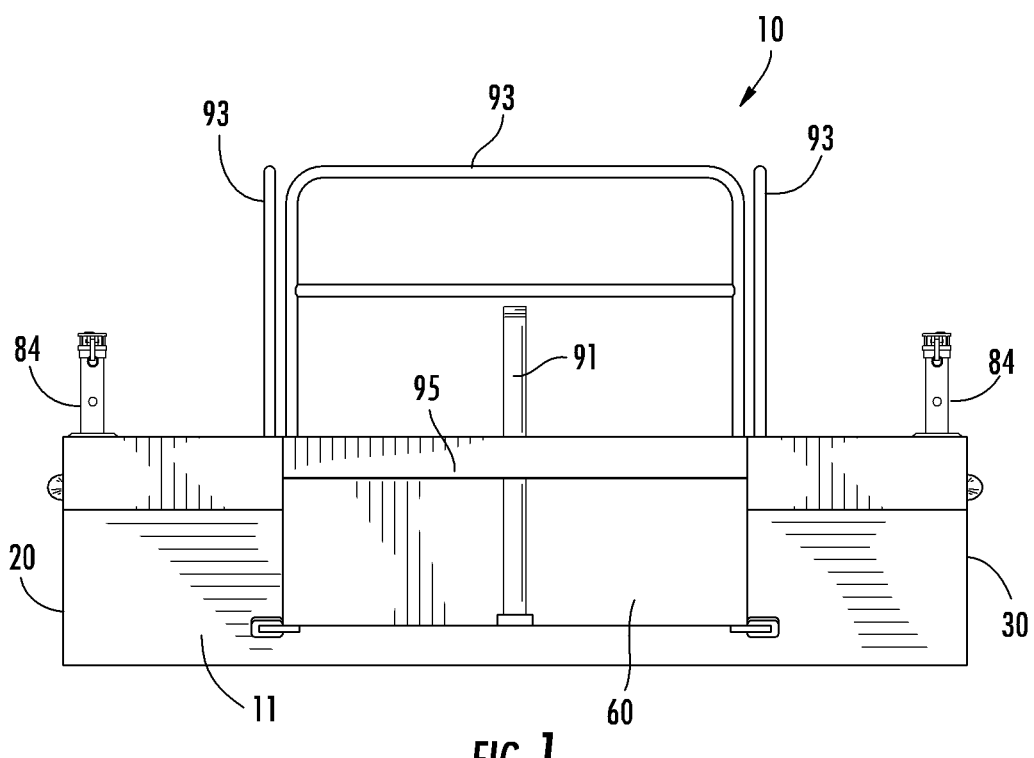
FIG. 1 is a front view of a preferred embodiment of the apparatus of the present invention.
Figure 2:
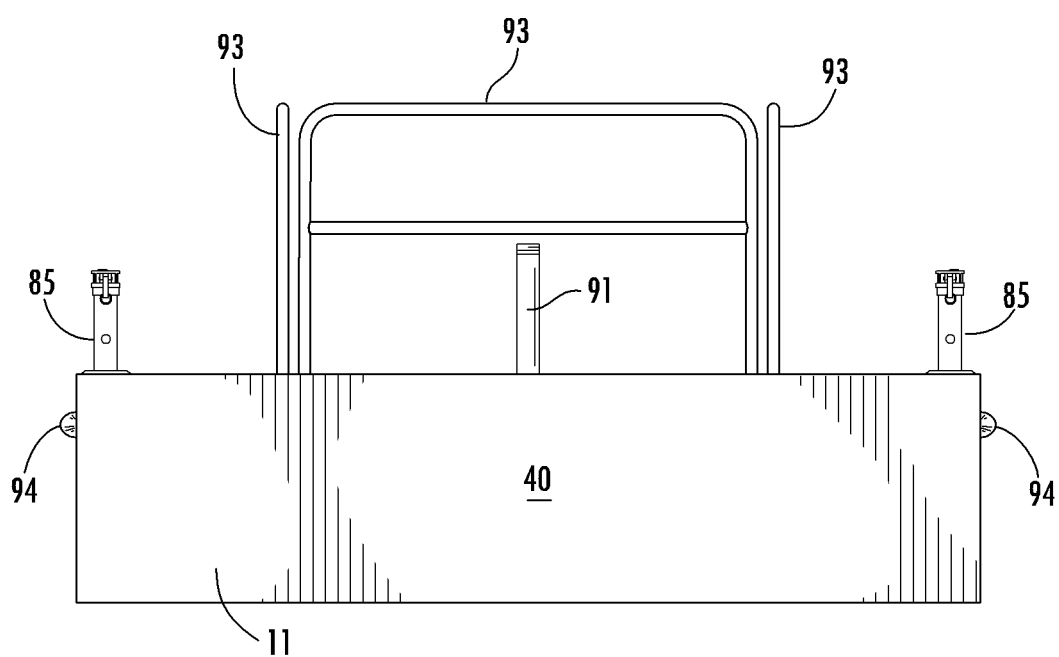
FIG. 2 is a rear view of a preferred embodiment of the apparatus of the present invention.
Figure 3:
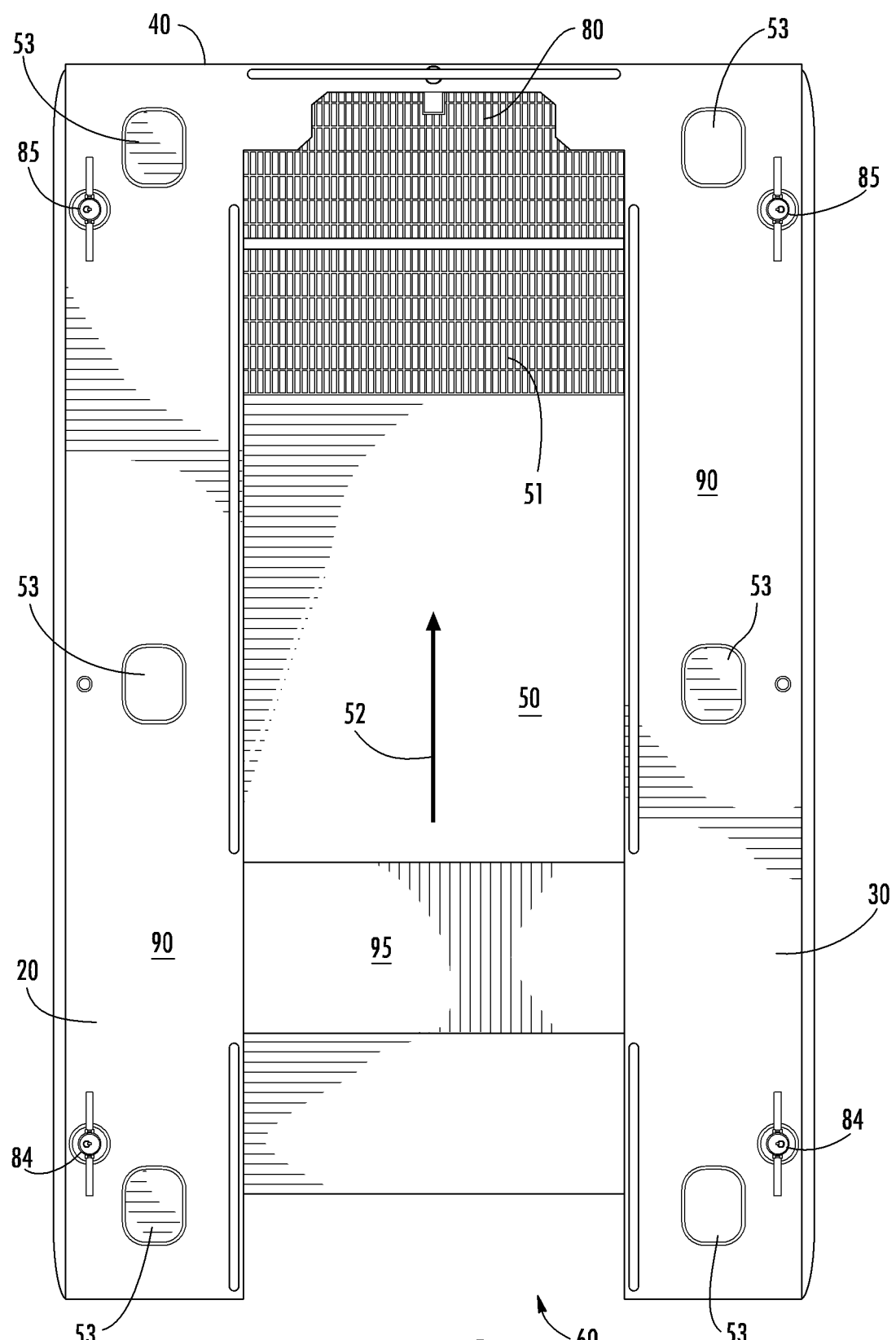
FIG. 3 is a top view of a preferred embodiment of the apparatus of the present invention.
Figure 4:
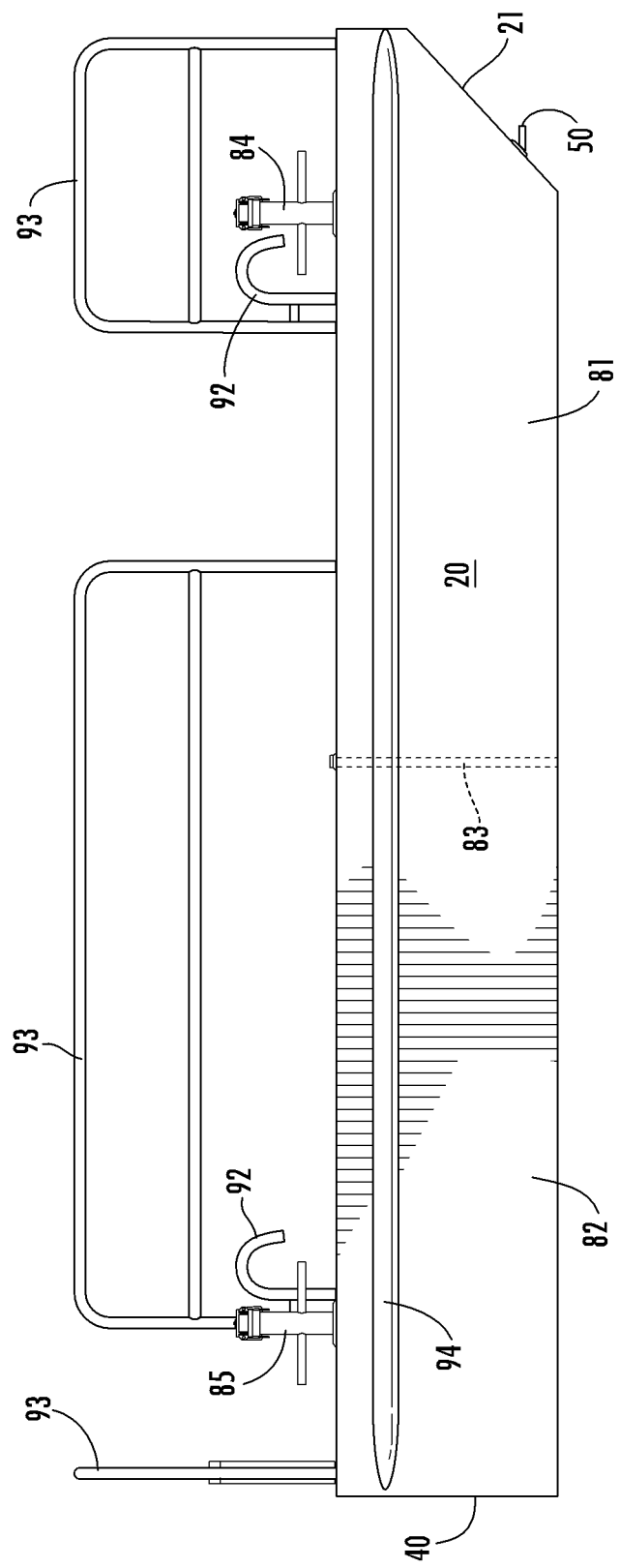
FIG. 4 is a right side view of a preferred embodiment of the apparatus of the present invention.
Figure 5:
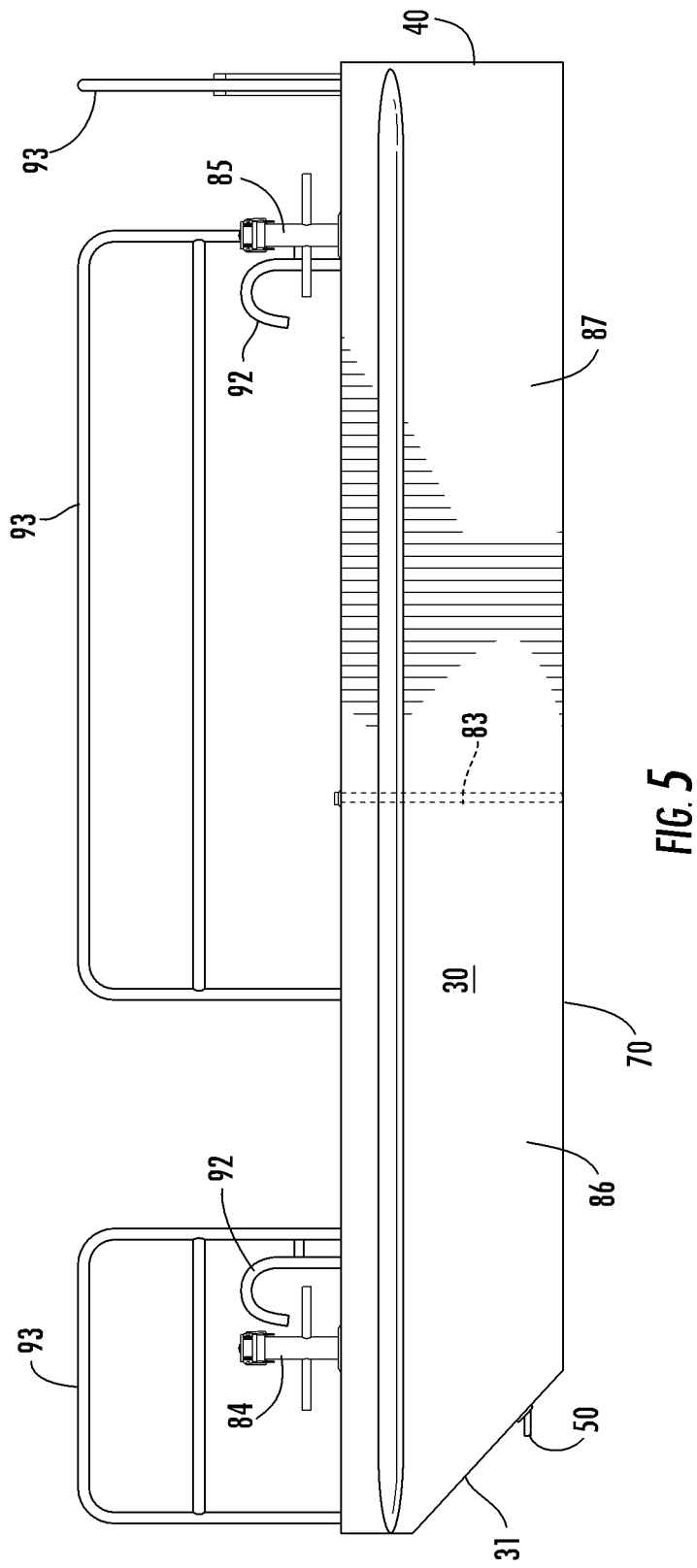
FIG. 5 is a left side view of a preferred embodiment of the apparatus of the present invention.
Figure 6:
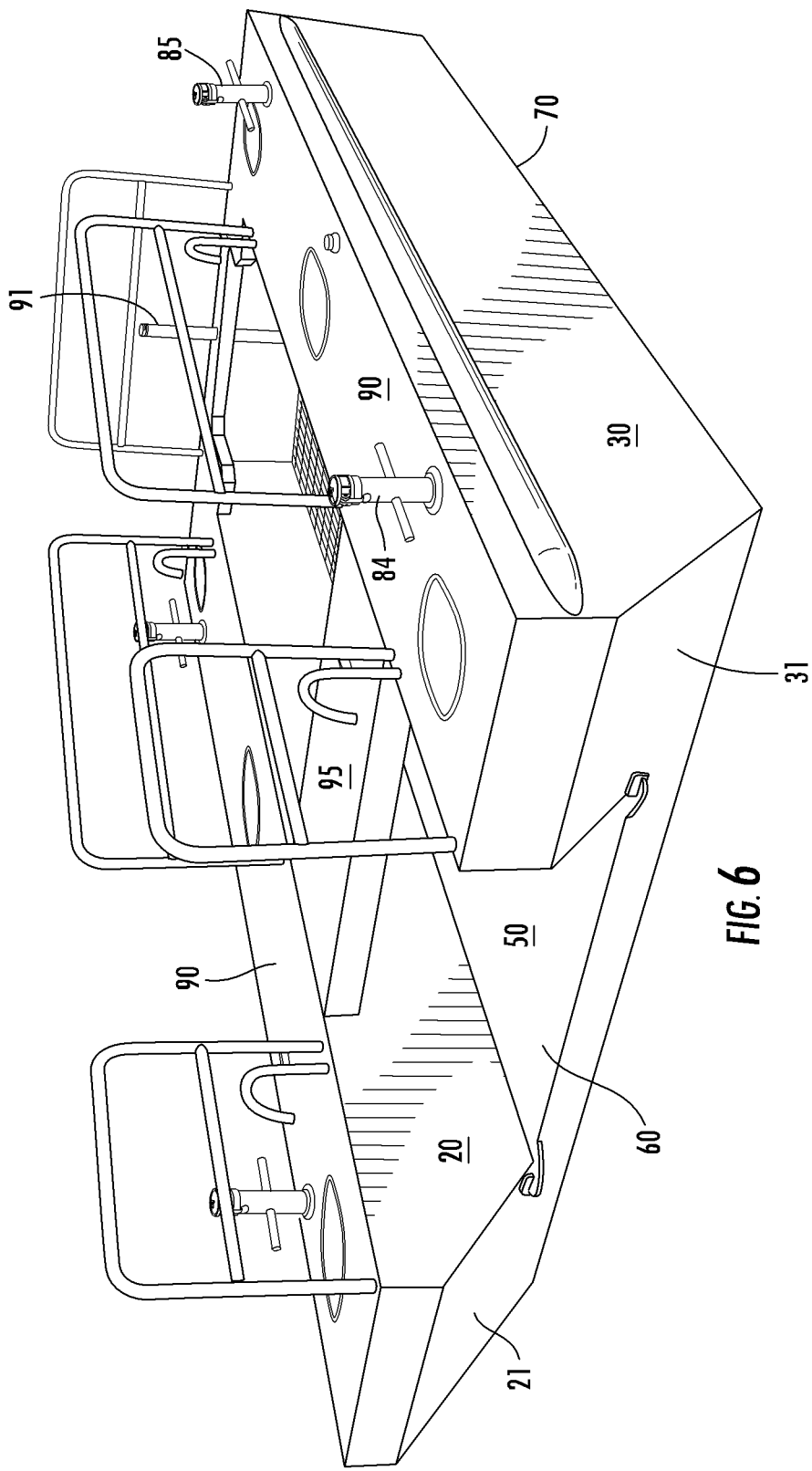
FIG. 6 is a perspective view of a preferred embodiment of the apparatus of the present invention.
Figure 7:
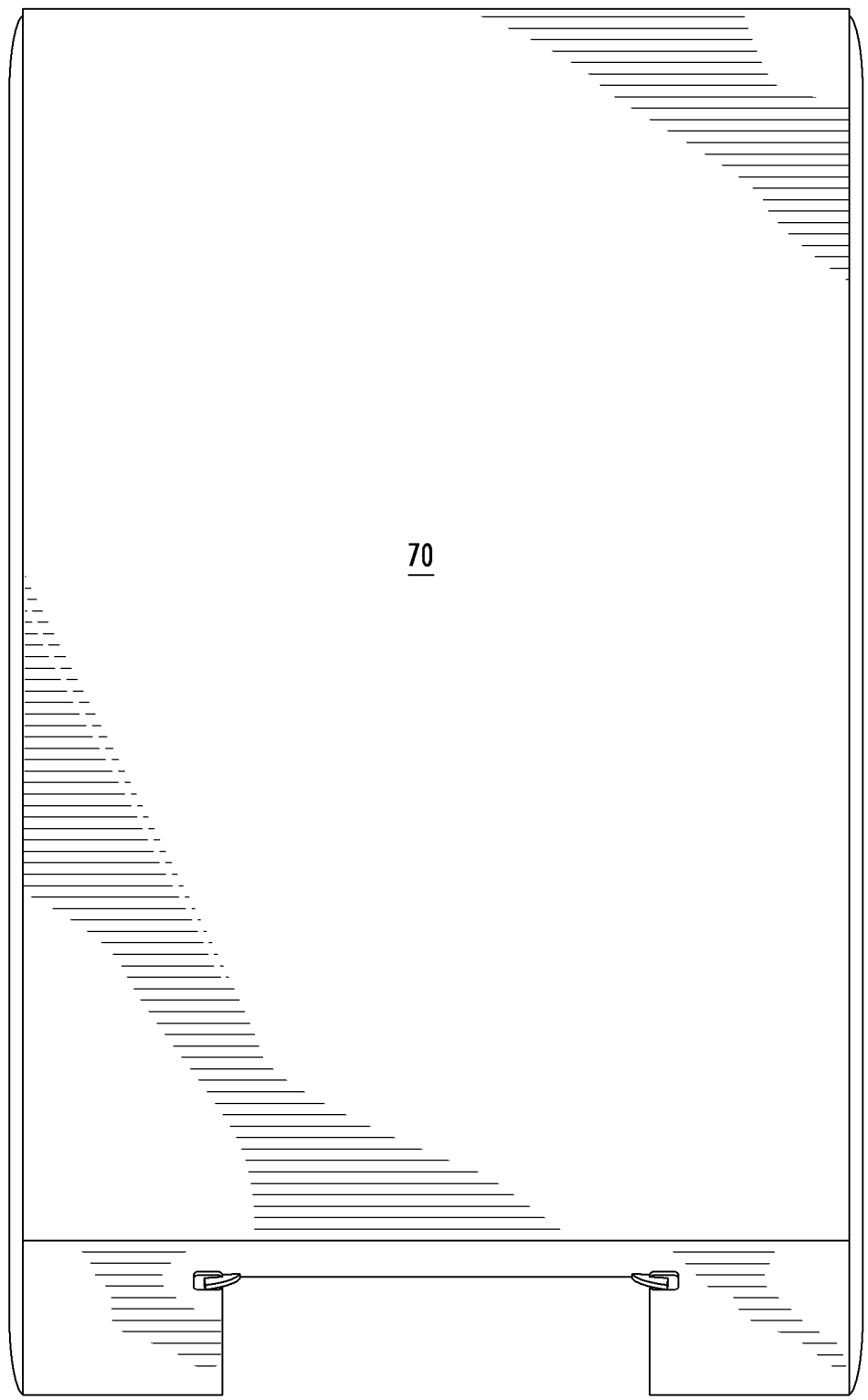
FIG. 7 is a bottom view of a preferred embodiment of the apparatus of the present invention.
Figure 8:
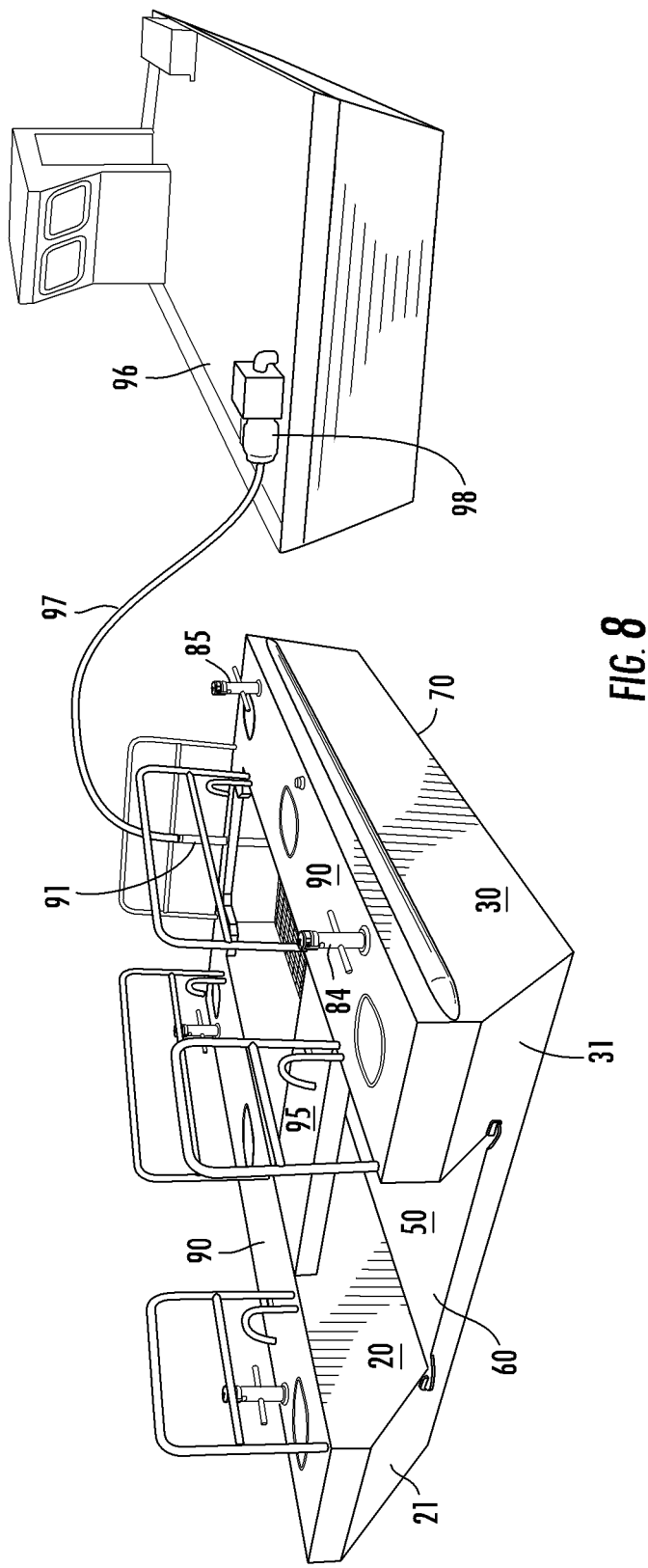
FIG. 8 is a perspective view of a preferred embodiment of the apparatus of the present invention.

The skimmer 10 of the present invention is a barge-style device for collecting oil or other pollutants from a water surface. The skimmer 10 can float right below the surface of the water. The skimmer can operate as a free standing vessel and does not need to be mounted to another vessel for operation. The skimmer of the present invention includes a right side wall/pontoon 20, a left side wall/pontoon 30, a rear wall 40, a floor 50 and a front opening 60. The floor of the skimmer is unobstructed. Floor 50 near opening 60 can be the same height as the part of floor 50 near the rear wall 40. The skimmer 10 has a bottom 70 as seen in FIGS. 4-6. The bottom 70 can be flat. Side walls/pontoons 20, 30 are angled at the ends 21, 31 closest to the front opening 60. The floor 50 extends from the front opening 60 to the rear wall 40. Side walls/pontoons can have bumpers 94 on the outside portion of the each wall 20, 30. The body of the skimmer 10 can be one piece, without any moveable parts.

The top of side walls/pontoons 20, 30 can have surface 90, on which a user can stand or sit and monitor the use of the skimmer 10. Railings 93 are attached onto surface 90 and can surround the skimmer floor. Railings 93 assist a user to move about the skimmer vessel during monitoring its use. Bridge 95 can be connected to surface 90 above and across the skimmer floor so that it does not interfere with the flow of oil into the skimmer. Access panels 53 can be located on surface 90 so that a user can access the interior of the skimmer and ballast tanks if necessary.

The skimmer has ballasts tanks 81, 82, 86, 87 that can be contained in body 11 of skimmer. The ballast tanks 81, 82, 86, 87 can sit on either side 20, 30 of the skimmer vessel so that the front opening 60 of the skimmer vessel can be adjusted to sit below the water surface at the level of the oil. Ballast tanks 81, 86 can be included in the front of pontoons 20, 30. Ballast tanks 82, 87 can be included in the rear of pontoon 20, 30. A wall 83 separates the front ballast tank 81, 86 from the rear ballast tank 82, 87. The wall 83 is preferably located in the middle of each pontoon. Optionally, the wall 83 can be located at any location in the pontoon 20, 30.

Inlets 84, 85 can be located on surface 90 of the skimmer apparatus. Front inlets 84 allow water to be added to the front ballast tanks 81, 86. Rear inlets 85 allow water to be added to the rear ballast tanks 82, 87. Vents 92 can be located on surface 90 and at the front and rear of each pontoon 20, 30. Vents 92 allow air to escape from the top of the ballast tank and be replaced by water entering through the ballast tank inlets 84, 85. The ballast tanks adjust the depth of the skimmer floor 50 into the oil and water so that the floor 50 sits at the interface of the oil and water. The platform floor is about one (1) to three (3) inches below the oil on the water surface, or variable to consistency of oil or pollutant floating on water surface. A storage vessel or barge 96 is connected to the skimmer 10 and holds all of the oil collected by the skimmer. During use, a user does not need to continually adjust the ballasts as the skimmer elevation does not change since the storage vessel/barge increases in weight due to the oil it picks up. The tanks are preferably ballasted so that the rear of the skimmer is preferably a little lower in elevation than the front of the skimmer.

The skimmer vessel can work stationary in the water, and does not require a propellor or pulling means for operation, as the oil will continue to flow into the skimmer as the oil is pumped out of the rear by the gravity flow to the rear of the vessel. The storage vessel or barge 96 can also be stationary with the skimmer vessel 10 while the barge pumps the oil from the skimmer vessel to the barge 96. The skimmer 10 can be self-propelled through a body of water with oil or other pollutants by the use of a propulsion device, preferably propellers, attached to the body 11 of the skimmer 10. Optionally, an outboard or hydraulic propeller can be attached to the skimmer. The skimmer can also be pushed with a small boat to direct it through the water.

When the skimmer floor 50 is at a desired level in the oil and water, oil flows into the front opening 60 onto the skimmer floor 50. The oil then moves across the floor 50 toward the rear wall 40, where the oil enters a rear location 80. The oil passes over grating 51 which can be located near rear wall 40. Grating 51 assists with preventing large debris from entering the rear location 80. The direction of the oil flow is indicated by arrow 52 in FIG. 3. The rear location 80 is preferably a box or tank. The box or tank 80 is a collection area that can sit at a lower elevation than the skimmer floor 50 intake so that the oil flows from the floor 50 into the rear location 80. Once the oil enters the rear location 80, it moves from the rear location 80 to a storage area/barge 96 via a suction pipe 91, hose 97 and hydraulic pump 98. The suction pipe 91 can be adjustable. The suction pipe 91 attaches from the rear location/tank 80 and discharges the collected oil through a hose 97 to a storage area 96, such as a barge or second vessel that can be situated close to the skimmer vessel, such as for example behind the skimmer (see FIG. 8). The hydraulic pump 98 is connected to the hose 97 on the storage vessel 96. Optionally, the hydraulic pump can be connected to the hose on the skimmer apparatus 10.

The storage vessel or barge 96 can be 12 feet wide×4 feet high×20 feet long with a capacity of 7,000 Gallons to 30 feet wide×8 feet high×120 feet long with a capacity of 168,300 Gallons. Ranges of dimensions for the skimmer 10 can be 12-30 feet wide by 20-120 feet long by 4-8 feet high; for example, skimmer 10 can be 12 feet wide by 4 feet high, by 20 feet long, or any multiple size thereof. The storage vessel or barge has a capacity of 7,000-168,300 gallons, for example 7,000 gallons, or any multiple size thereof of oil or other pollutant.

Experimental results have shown about 95% oil pick up.

The skimmer 10 can be made of aluminum or steel. Exemplary dimensions of the skimmer 10 can be 12-36 feet wide by 20-60 feet long by 3-7 feet high, for example 12 feet wide by 20 feet long by 3 feet high or any multiple size thereof. Skimmer 10 can be sized up or down as desired or appropriate for a particular job.

While preferably the skimmer is self propelled, it can also be stationary and oil can feed into the box 80 via gravity alone when the front opening 60 is positioned at the oil water interface.

PARTS LIST

The following is a list of suitable parts and materials for the various elements of the preferred embodiment of the present invention.

| Parts Number | Description |
| --- | --- |
| 10 | skimmer |
| 11 | skimmer body |
| 20 | right side wall |
| 21 | end |
| 30 | left side wall |
| 31 | end |
| 40 | rear wall |
| 50 | floor |
| 51 | grating |
| 52 | arrow |
| 53 | access panel |
| 60 | front opening |
| 70 | bottom |
| 80 | rear location |
| 81 | front ballast tank |
| 82 | rear ballast tank |
| 83 | wall |
| 84 | front ballast inlet |
| 85 | rear ballast inlet |
| 86 | front ballast tank |
| 87 | rear ballast tank |
| 90 | surface |
| 91 | suction pipe |
| 92 | vent |
| 93 | railing |
| 94 | bumper |
| 95 | bridge |
| 96 | barge |
| 97 | hose |
| 98 | pump |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. An apparatus for removing oil or other pollutants from a body of water having a water surface, comprising:
   a) a platform having a bow, a stern, a platform length between said bow and said stern, a pair of spaced apart pontoons providing floatation, and each pontoon extending from said bow to said stern, one pontoon providing a left inside side wall, the other pontoon providing a right inside side wall, said platform having a rear wall next to said stern, a front opening, a floor, and a bottom;
   b) wherein the pontoons adjust the platform floor relative to a level of oil or other pollutants on the water surface;
   c) each pontoon having one or more floatation chambers and a pontoon length, wherein said floor extends from said left inside side wall to said right inside side wall and from said front opening over a majority of each said pontoon length to a position that is next to said rear wall;
   d) wherein the oil or other pollutants flows from the front opening across the floor to the rear wall;
   e) a collection vessel behind said floor and next to the rear wall to collect the oil or other pollutants from the platform floor;
   f) said floor having a smooth uninterrupted upper surface that extends a majority of the length of each said pontoon, from said front opening to said collection vessel and from said left inside side wall to said right inside side wall; and
   g) a pump connected to the collection vessel that removes the oil or other pollutants from the collection vessel to a storage area wherein oil or other pollutants in the storage area does not affect the floatation of the platform.

2. The apparatus of claim 1, wherein in step "b" the platform floor is about one to three inches below the oil or other pollutants on the water surface.

3. The apparatus of claim 1, wherein in step "b" the platform floor is positioned below the oil and other pollutants to be removed.

4. The apparatus of claim 1, wherein the floatation chambers are located next to the left inside side wall and the right inside side wall.

5. The apparatus of claim 1, wherein the collection vessel is a box or tank.

6. The apparatus of claim 1, wherein the pump is a hydraulic pump.

7. The apparatus of claim 1, wherein the collection vessel sits at a lower elevation than the elevation of the floor.

8. An apparatus for removing oil or other pollutants from a body of water having a water surface, comprising:
   a) a platform having a bow, a stern, a platform length, a left inside side wall, a right inside side wall, a rear wall, a front opening, a floor that extends over a majority of said platform length and from the left inside side wall to the right inside side wall, and said platform having a bottom;
   b) a pair of spaced apart pontoons that each extend over a majority of the distance between said bow and said stern, each pontoon having a length and providing one or more floatation chambers which adjust the platform floor relative to a level of oil or other pollutants on the water surface;
   c) wherein the oil or other pollutants flows from the front opening across the floor to the rear wall;
   d) a rear collection location near the rear wall to collect the oil or other pollutants from the platform floor;
   e) said floor having a smooth uninterrupted surface that extends from said front opening to said rear collection location, from said left inside side wall to said right inside side wall and over a majority of the length of each pontoon; and
   f) a pump connected to the rear location that moves the oil or other pollutants from the rear location to a storage area which does not affect the floatation chambers of the platform.

9. The apparatus of claim 8, wherein in step "b" the platform floor is positioned at an interface of the oil or other pollutants and said body of water.

10. The apparatus of claim 8, wherein in step "b" the platform floor floats below the surface of the oil or other pollutants.

11. The apparatus of claim 8, wherein the floatation chambers are located next to the left inside side wall and the right inside side wall.

12. The apparatus of claim 8, wherein the rear location is a box or tank.

13. The apparatus of claim 8, wherein the pump is a hydraulic pump.

14. The apparatus of claim 8, wherein the rear location sits at a lower elevation than the floor.

* * * * *